United States Patent
Ohta

(10) Patent No.: US 9,950,254 B2
(45) Date of Patent: Apr. 24, 2018

(54) INFORMATION PROCESSING APPARATUS, INFORMATION PROCESSING SYSTEM, STORAGE MEDIUM AND INFORMATION PROCESSING METHOD

(71) Applicant: NINTENDO CO., LTD., Minami-ku, Kyoto (JP)

(72) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 100 days.

(21) Appl. No.: 14/534,861

(22) Filed: Nov. 6, 2014

(65) Prior Publication Data

US 2015/0297992 A1 Oct. 22, 2015

(30) Foreign Application Priority Data

Apr. 22, 2014 (JP) .................................. 2014-088081

(51) Int. Cl.
*A63F 13/24* (2014.01)
*A63F 13/23* (2014.01)
(Continued)

(52) U.S. Cl.
CPC ............. *A63F 13/24* (2014.09); *A63F 13/20* (2014.09); *A63F 13/21* (2014.09); *A63F 13/22* (2014.09);
(Continued)

(58) Field of Classification Search
CPC ........... A63F 13/20–13/98; A63F 13/00–13/12
See application file for complete search history.

(56) References Cited

U.S. PATENT DOCUMENTS 7,412,348 B2 * 8/2008 Okamura ................ A63F 13/10 463/1
8,562,437 B2 * 10/2013 Matsuda ............... G06F 3/0213 345/161

(Continued)

FOREIGN PATENT DOCUMENTS

JP H05-064932 8/1993
JP 2004-178102 6/2004
(Continued)

OTHER PUBLICATIONS

Extended European Search Report dated Mar. 19, 2015 issued in corresponding European Application No. 14192249.2 (8 pgs.).

(Continued)

*Primary Examiner* — William H McCulloch, Jr.
*Assistant Examiner* — Yingchuan Zhang
(74) *Attorney, Agent, or Firm* — Nixon & Vanderhye, P.C.

(57) ABSTRACT

A non-limiting example information processing apparatus includes an operating device including an analog stick that also functions as a depressible push button. Processing circuitry of the apparatus is configured to receive inclination information indicative of an inclination of a stick portion of the analog stick; use the received inclination information as an input for a first information processing operation; receive depression information indicative of a depressing of the stick portion of the analog stick; use the received depression information as an input for a second information processing operation different from the first information processing operation; and invalidate received depression information when inclination information indicative of inclination greater than a predetermined inclination is currently received.

4 Claims, 10 Drawing Sheets

(51) Int. Cl.
*A63F 13/20* (2014.01)
*A63F 13/42* (2014.01)
*A63F 13/21* (2014.01)
*A63F 13/22* (2014.01)

(52) U.S. Cl.
CPC .............. *A63F 13/23* (2014.09); *A63F 13/42* (2014.09); *A63F 2300/10* (2013.01); *A63F 2300/1018* (2013.01)

(56) References Cited

U.S. PATENT DOCUMENTS

| | | | |
|---|---|---|---|
| 8,758,142 B2 * | 6/2014 | Suzuki | A63H 30/04 463/31 |
| 9,322,146 B2 * | 4/2016 | Marquette | E02F 9/2012 |
| 2004/0108993 A1 | 6/2004 | Suzuki et al. | |
| 2012/0289336 A1 | 11/2012 | Matsuda et al. | |
| 2012/0307016 A1 * | 12/2012 | Uenaka | H04N 13/0221 348/47 |
| 2013/0281212 A1 | 10/2013 | Tsuchiya et al. | |
| 2013/0314608 A1 | 11/2013 | Ito et al. | |

FOREIGN PATENT DOCUMENTS

| | | |
|---|---|---|
| JP | 2005-004354 | 1/2005 |
| WO | WO 2013/157052 | 10/2013 |

OTHER PUBLICATIONS

English-language machine translation of JPH05-064932.
English-language machine translation of JP2005-004354.

* cited by examiner

FIG. 4

TERMINAL OPERATION DATA

| TOUCH PANEL | | | |
|---|---|---|---|
| FIRST ANALOG STICK | | | |
| STICK | | BUTTON | |
| SECOND ANALOG STICK | | | |
| STICK | | BUTTON | |
| CROSS BUTTON | | | |
| UPWARD BUTTON | DOWNWARD BUTTON | LEFTWARD BUTTON | RIGHTWARD BUTTON |
| A BUTTON | | | |
| B BUTTON | | | |
| X BUTTON | | | |
| Y BUTTON | | | |
| ⋮ | | | |

INFORMATION PROCESSING APPARATUS, INFORMATION PROCESSING SYSTEM, STORAGE MEDIUM AND INFORMATION PROCESSING METHOD

CROSS REFERENCE OF RELATED APPLICATION

The disclosure of Japanese Patent Application No. 2014-088081 filed on Apr. 22, 2014 is incorporated herein by reference.

FIELD

This application describes an information processing apparatus, information processing system, storage medium and information processing method, receiving an operation signal from an operating device having a button and an analog stick.

SUMMARY

It is a primary object of the present embodiment to provide a novel information processing apparatus, information processing system, storage medium and information processing method.

Furthermore, another object of the present embodiment is to provide an information processing apparatus, information processing system, storage medium and information processing method, capable of preventing information processing according to instructions that an operator does not intend to from being performed.

A first embodiment is an information processing apparatus performing information processing according to an operation of an operating device that comprises an analog stick that also functions as a push button when depressing. The information processing apparatus comprises a first receiving module, a second receiving module and a correcting module. The first receiving module is operable to receive inclination information indicating that a stick portion of the analog stick is inclined. The second receiving module is operable to receive depression information indicating that the stick portion of the analog stick is depressed. The correcting module is operable to invalidate, when one of the first receiving module and the second receiving module receives the information, the information that is received by other one of the first receiving module and the second receiving module.

In accordance with the first embodiment, in a case where one of the inclination information and the depression information is received, even if the other information is received, the other information is invalidated, and therefore, it is possible to prevent the information processing according to a designation that an operator does not intend to from being performed.

A second embodiment is according to the first embodiment, wherein the correcting module is operable to invalidate the depression information when the depression information is received by the second receiving module if the inclination information is being received by the first receiving module. Accordingly, the depression information is not used for the information processing.

In accordance with the second embodiment, since the depression information of the stick portion is invalidated in a case where the stick portion is inclined, it is possible to perform the information processing with using the inclination information rather than the depression information.

A third embodiment is according to the second embodiment, wherein the correcting module is operable to invalidate, when the stick portion is changed from a non-depressed state to a depressed state, the depression information that is received by the second receiving module according to an inclining amount indicated by the inclination information that is received by the first receiving module. A reason why a condition that the stick portion is changed from the non-depressed state to the depressed state is used is for preventing the depression information that has been invalidated from being received in a case where the stick portion is operated to eliminate the inclination in a state that the stick portion is being depressed.

In accordance with the third embodiment, since it is added as a condition that the stick portion is changed from the non-depressed state to the depressed state, it is possible to more effectively prevent the information processing according to a designation that an operator does not intend to from being performed.

A fourth embodiment is according to the second embodiment, wherein the correcting module is operable to invalidate the depression information that is received by the second receiving module when the inclining amount indicated by the inclination information that is received by the first receiving module is equal to or more than a predetermined amount. The stick portion tends to be depressed as the inclining amount of the stick portion is increased. Furthermore, there is an occasion that the stick portion is slightly inclined when the stick portion is depressed. Therefore, a condition that the inclining amount is equal to or more than the predetermined amount is used.

In accordance with the fourth embodiment, since the depression information that is received is invalidated when the inclining amount of the stick portion is equal to or more than the predetermined amount, it is possible to more effectively prevent the information processing according to a designation that an operator does not intend to from being performed.

A fifth embodiment is according to the first embodiment, wherein the correcting module is operable to invalidate the depression information by replacing the depression information with non-depression information.

In accordance with the fifth embodiment, since the depression information is merely replaced with the non-depression information, the correction can be performed easily.

A sixth embodiment is according to the first embodiment, wherein the correcting module is operable to invalidate the inclination information, when the inclination information is received by the first receiving module if the depression information is received by the second receiving module or if a predetermined time period does not elapse after a state that the depression information is received by the second receiving module is changed to a state that no depression information becomes to be received by the second receiving module. Accordingly, the inclination information is not used for the information processing.

In accordance with the sixth embodiment, in a state that the stick portion is depressed or within the predetermined time period after the depressed state is canceled, the inclination information is invalidated, and accordingly, even if the stick portion is inclined through an operation for turning on or turning off in a case where the stick portion is used as a push button, the inclination information is not used for the information processing. Therefore, it is possible to prevent the information processing according to a designation that an operator does not intend to from being performed.

A seventh embodiment is according to the sixth embodiment, wherein the correcting module is operable to invalidate the inclination information by replacing the inclination information with non-inclination information.

In accordance with the seventh embodiment, since the inclination information is merely replaced with the non-inclination information, the correction can be performed easily.

An eighth embodiment is an information processing apparatus performing information processing according to an operation of an operating device that comprises an analog stick that also functions as a push button when depressing. The information processing apparatus comprises a first detecting module, a second detecting module and a correcting module. The first detecting module is operable to detect first operation information that is input from the operating device. The second detecting module is operable to detect an operating status of the analog stick based on the first operation information that is detected by the first detecting module. The correcting module is operable to correct the first operation information to second operation information that is to be used in the information processing based on the first operation information that is detected by the first detecting module and the operating status that is detected by the second detecting module.

In accordance with the eighth embodiment, since the first operation information is corrected to the second operation information according to the operating status of the analog stick, it is possible to prevent the information processing according to a designation that an operator does not intend to from being performed.

A ninth embodiment is an information processing system performing information processing according to an operation of an operating device that comprises an analog stick that also functions as a push button when depressing, comprising: a first receiving module operable to receive inclination information indicating that a stick portion of the analog stick is inclined; a second receiving module operable to receive depression information indicating that the stick portion of the analog stick is depressed; and a correcting module operable to invalidate, when one of the first receiving module and the second receiving module receives the information, the information that is received by other one of the first receiving module and the second receiving module.

A tenth embodiment is an information processing system performing information processing according to an operation of an operating device that comprises an analog stick that also functions as a push button when depressing, comprising: a first detecting module operable to detect first operation information that is input from the operating device; a second detecting module operable to detect an operating status of the analog stick based on the first operation information that is detected by the first detecting module; and a correcting module operable to correct the first operation information to second operation information that is to be used in the information processing based on the first operation information that is detected by the first detecting module and the operating status that is detected by the second detecting module.

An eleventh embodiment is a non-transitory storage medium storing an information processing program that causes a computer to perform information processing according to an operation of an operating device that comprises an analog stick that also functions as a push button when depressing, the information processing program further causes the computer to function as: a first receiving module operable to receive inclination information indicating that a stick portion of the analog stick is inclined; a second receiving module operable to receive depression information indicating that the stick portion of the analog stick is depressed; and a correcting module operable to invalidate, when one of the first receiving module and the second receiving module receives the information, the information that is received by other one of the first receiving module and the second receiving module.

A twelfth embodiment is a non-transitory storage medium storing an information processing program that causes a computer to perform information processing according to an operation of an operating device that comprises an analog stick that also functions as a push button when depressing, the information processing program further causes the computer to function as: a first detecting module operable to detect first operation information that is input from the operating device; a second detecting module operable to detect an operating status of the analog stick based on the first operation information that is detected by the first detecting module; and a correcting module operable to correct the first operation information to second operation information that is to be used in the information processing based on the first operation information that is detected by the first detecting module and the operating status that is detected by the second detecting module.

A thirteenth embodiment is an information processing method of a computer that performs information processing according to an operation of an operating device that comprises an analog stick that also functions as a push button when depressing, the computer performing steps of: (a) receiving inclination information indicating that a stick portion of the analog stick is inclined; (b) receiving depression information indicating that the stick portion of the analog stick is depressed; and (c) invalidating, when the information is received in one of the steps (a) and (b), the information that is received by other one of the steps (a) and (b).

A fourteenth embodiment is an information processing method of a computer that performs information processing according to an operation of an operating device that comprises an analog stick that also functions as a push button when depressing, the computer performing steps of: (a) detecting first operation information that is input from the operating device; (b) detecting an operating status of the analog stick based on the first operation information that is detected in the step (a); and (c) correcting the first operation information to second operation information that is to be used in the information processing based on the first operation information that is detected in the step (a) and the operating status that is detected in the step (b).

In accordance with each of the eighth to fourteenth embodiments, as similar to the first embodiment, it is possible to prevent the information processing according to a designation that is not intended by an operator from being performed.

The above described objects and other objects, features, aspects and advantages of the embodiments will become more apparent from the following detailed description when taken in conjunction with the accompanying drawings.

BRIEF DESCRIPTION OF THE DRAWINGS

FIG. 4 is a view showing non-limiting contents of terminal operation data.

DETAILED DESCRIPTION OF NON-LIMITING EXAMPLE EMBODIMENTS

Figure 1:
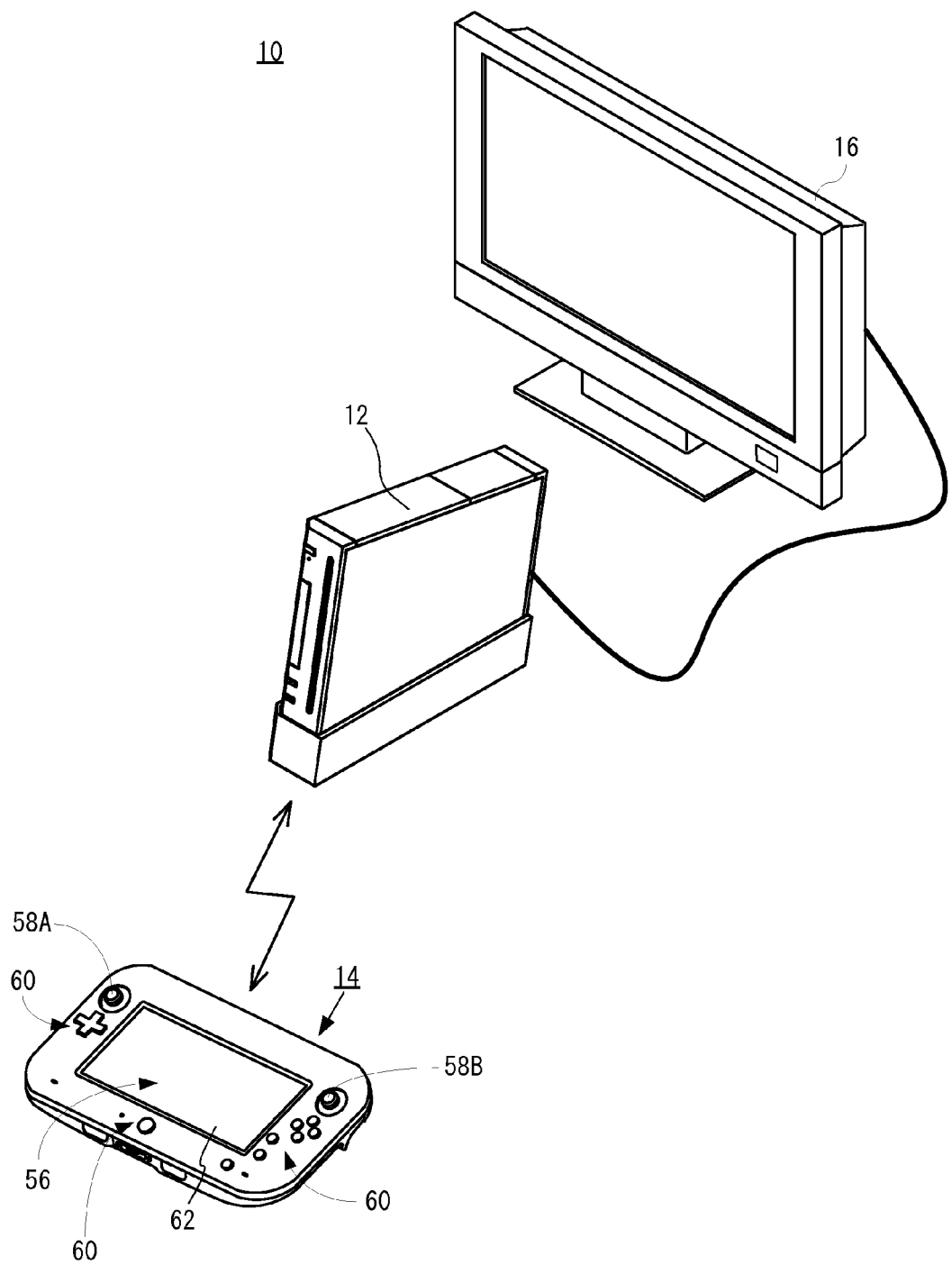
FIG. 1 is an appearance view of a non-limiting example game system.

A non-limiting example game system 10 according to an embodiment is described with referring to drawings below. The game system 10 shown in FIG. 1 includes a stationary-type game apparatus 12 and a potable-type terminal device 14. Furthermore, the game system 10 includes a stationary-type display device (hereinafter, referred to "television") 16 typified by a television receiver or the like, and the game apparatus 12 and the television 16 are connected with each other via a connecting cord. In the game system 10, game processing is performed in the game apparatus 12 based on a game operation using the terminal device 14, and a game image obtained by the game processing is displayed on the television 16 and/or the terminal device 14.

Although not shown, into the game apparatus 12, the optical disk that is an example of an information storage medium that is used to be replaceable with respect to the game apparatus 12 is detachably loaded. In the optical disk, an information processing program (typically, an application program such as a game program) to be executed in the game apparatus 12 is stored. The game apparatus 12 performs information processing (game processing) by reading and executing the information processing program stored in the optical disk.

The television 16 displays the game image obtained through the game processing performed by the game apparatus 12. The television 16 has a speaker 16a (FIG. 2), and the speaker 16a outputs a game sound obtained as a result of the game processing described above.

In addition, in another embodiment, the game apparatus 12 and the stationary-type display device may be integrally formed with each other. Furthermore, a communication between the game apparatus 12 and the television 16 may be performed wirelessly.

The terminal device 14 sends and receives data with at least the game apparatus 12. The user (player) can use the terminal device 14 by moving it with his or her hands, and by placing the terminal device 14 at an arbitrary position. The terminal device 14 has an inputting means such as a touch panel 56, an analog stick 58 and operating buttons 60 and a displaying means such as an LCD 62. The terminal device 14 can communicate with the game apparatus 12 through a wireless communication using a technique of Bluetooth (registered trademark), for example; however, the terminal device 14 and the game apparatus 12 may be connected to each other by a cable or wire. The terminal device 14 receives from the game apparatus 12 data of an image (game image, for example) produced in the game apparatus 12, and displays an image that is received on the LCD 62. Furthermore, the terminal device 14 sends to the game apparatus 12 terminal operating data indicating a content of the operation performed on the user's own device.

It should be noted that in this embodiment, an LCD is employed as a display device, but the terminal device 14 may include other arbitrary display device such as a display using EL (Electro Luminescence), for example.

Additionally, in FIG. 1, the number of terminal devices 14 included in the game system 10 is one (1), but the game apparatus 12 can communicate with a plurality of terminal devices 14, and it is possible for a plurality of persons to play a game by simultaneously using a predetermined number of terminal devices 14.

Figure 2:
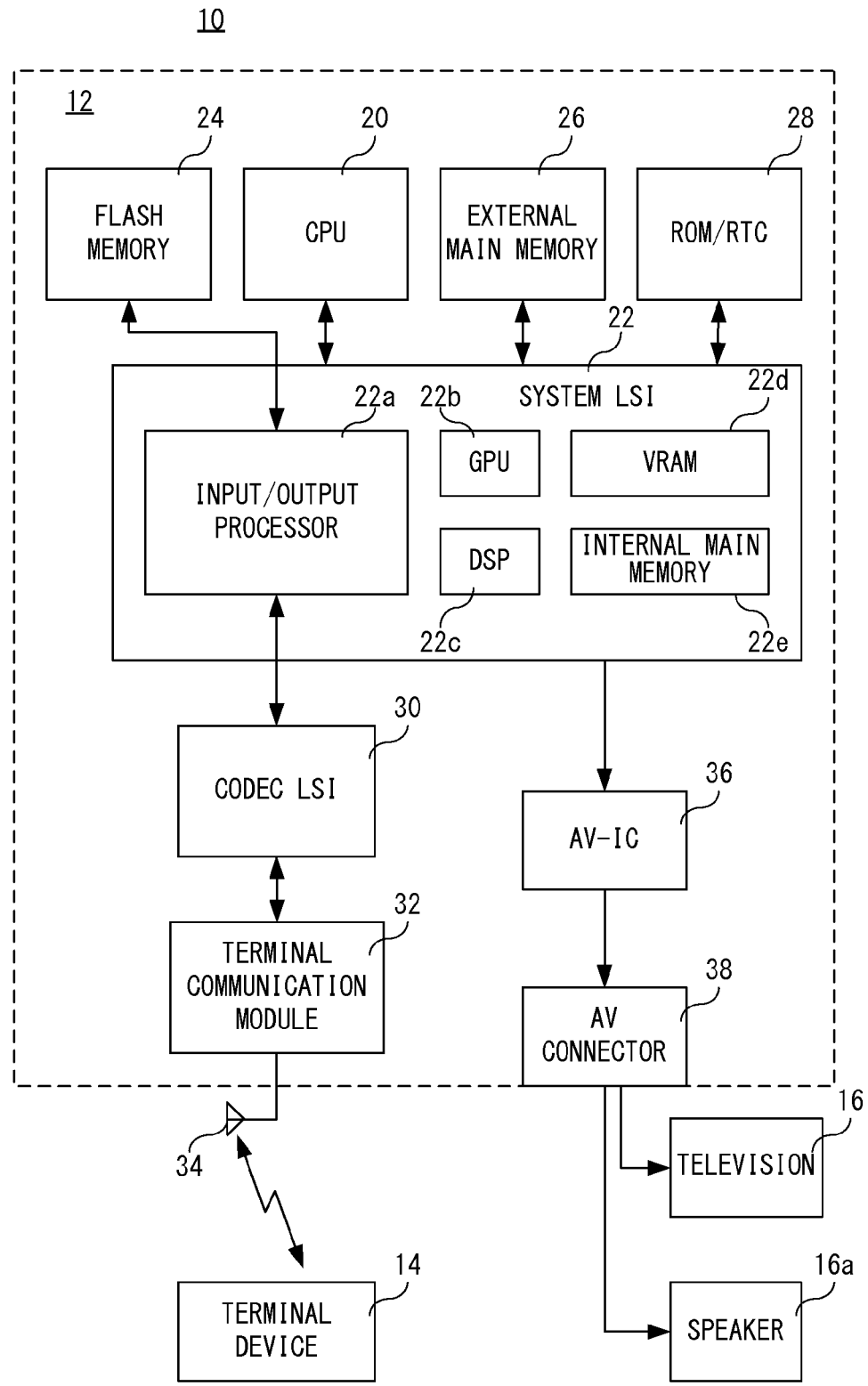
FIG. 2 is a block diagram showing a non-limiting example electric configuration of a game apparatus.

FIG. 2 is a block diagram showing a non-limiting example electric configuration of a game apparatus 12. The game apparatus 12 has a CPU 20, a system LSI 22, an external main memory 26, a ROM/RTC 28, an AV-IC 36, etc.

The CPU 20 is for performing the game processing by executing the game program stored in the optical disk, and functions as a game processor. The CPU 20 is connected to the system LSI 22. The system LSI 22 is connected with the external main memory 26, the ROM/RTC 28 and the AV-IC 36 in addition to the CPU 20. The system LSI 22 performs processing for controlling data transfer between the respective components connected thereto, producing images to be displayed, acquiring data from external information processing devices, and so on.

The external main memory 26 being volatile is for storing programs such as a game program read from the optical disk, a game program, etc. read from the flash memory 24, storing various data, and is utilized as a working area and a buffer area for the CPU 20. The ROM/RTC 28 has a ROM (so called boot ROM) including a program for activating the game apparatus 12 and a clock circuit (RTC) for counting a time.

In addition, program data, texture data, etc. read from the optical disk are written into an internal main memory 22e described later or the external main memory 26.

The system LSI 22 is provided with an input-output processor (I/O processor) 22a, a GPU 22b, a DSP 22c, a VRAM 22d, and the internal main memory 22e. Although illustration is omitted, these components 22a-22e are connected with each other by internal buses.

The GPU 22b configures a part of a depicting or drawing means, and produces image data according to a graphics command from the CPU 20. Here, data such as polygon data, texture data, etc. read from the main memory (22e, 26) is stored in the VRAM 22d, and the GPU 22b produces the image data by using such the data. In this embodiment, the game apparatus 12 produces both of a game image to be displayed on the television 16 and a game image to be displayed on the terminal device 14. Hereinafter, the game image displayed on the television 16 may be called as "television game image", and the game image displayed on the terminal device 14 may be called as "terminal game image".

The DSP 22c functions as an audio processor, and generates sound data by using sound data and sound waveform (tone) data stored in the internal main memory 22e and the external main memory 26. In this embodiment, with respect to the game sound, as similar to the game image, both of a game sound to be output from the speaker 16a of the television 16 and a game sound to be output from the speaker 66 of the terminal device 14 are produced. Hereinafter, the game sound output from the television 16 may be called as "television game sound", and the game sound output from the terminal device 14 may be called as "terminal game sound".

As described above, data of images and sounds (including sound effects, game music, etc. This holds true below.) to be output by the television 16 out of the images and sounds produced in the game apparatus 12 are read by the AV-IC 36. The AV-IC 36 outputs the read image data to the television 16 via the AV connector 38, and outputs the read sound data to the speaker 16a incorporated in the television 16. Thus, an image is displayed on the television 16 while a sound is output from the speaker 16a.

Furthermore, data of images and sounds to be output by the terminal device 14 out of the images and sounds produced in the game apparatus 12 are sent to the terminal device 14 by the input-output processor 22a, etc. The data transmission to the terminal device 14 by the input-output processor 22a, etc. is described later.

The input-output processor 22a performs data transmission and reception with the components connected thereto, and performs downloading data from external information processing devices. Also, the input-output processor 22a is connected to the flash memory 24 and a codec LSI 30. The codec LSI 30 is connected with a terminal communication module 32, and an antenna 34 is connected to the terminal communication module 32.

The CPU 20 executes the game program to thereby read the data stored in the flash memory 24 so as to use the data in the game program. In the flash memory 24, in addition to the data to be sent and received between the game apparatus 12 and the external information processing apparatuses, save data (result data or proceeding data of the game) of the game played by using the game apparatus 12 may be stored. Also, in the flash memory 24, the game program may be stored.

In addition, although not shown, the input-output processor 22a can be connected to a network such as an internet, etc. with using the network communication module so as to perform a communication with (send/receive data to or from) an external information processing apparatus (another game apparatus, various kinds of servers, etc., for example) that is connected to the network.

Furthermore, the game apparatus 12 can send and receive data of images or videos, sounds, etc. to and from the terminal device 14. The input-output processor 22a outputs the data of the game image produced by the GPU 22b to the codec LSI 30 if sending the game image (terminal game image) to the terminal device 14. The codec LSI 30 performs predetermined compression processing on the image data from the input-output processor 22a. The terminal communication module 32 communicates with the terminal device 14 wirelessly. Accordingly, the image data compressed by the codec LSI 30 is sent to the terminal device 14 via the antenna 34 by the terminal communication module 32. In this embodiment, the codec LSI 30 compresses the image data by using a high efficient compression technique, such as H.264 standard, for example.

It should be noted that a compression technique except for it may be used, and the image data may be adapted to be sent without being compressed if the communication speed is high enough.

Furthermore, the terminal communication module 32 is a communication module for that the Wi-Fi certification is obtained, for example, and may use a MIMO (Multiple Input Multiple Output) technique employed in IEEE802.11n standard, for example, to thereby make high speed wireless communications with the terminal device 14, or may use other communication systems.

In addition, the game apparatus 12 sends sound data to the terminal device 14 besides the image data. That is, the input-output processor 22a outputs the sound data produced by the DSP 22c to the terminal communication module 32 via the codec LSI 30. The codec LSI 30 also performs the compression processing on the sound data, similar to the image data. The compression format of the sound data may be of any format. In another embodiment, the sound data may be sent without being compressed. The terminal communication module 32 sends the compressed image data and sound data to the terminal device 14 via the antenna 34.

In addition, the game apparatus 12 can receive (accept) various data from the terminal device 14. In this embodiment, the terminal device 14 sends terminal operating data, image data, and sound data. Each data sent from the terminal device 14 is received by the terminal communication module 32 via the antenna 34. Here, the image data and the sound data from the terminal device 14 is performed with compression processing similar to the image data and the sound data from the game apparatus 12 to the terminal device 14.

Accordingly, the image data and the sound data are sent from the terminal communication module 32 to the codec LSI 30, and then, conducted to expansion processing by the codec LSI 30, and are output to the input-output processor 22a.

Figure 3:
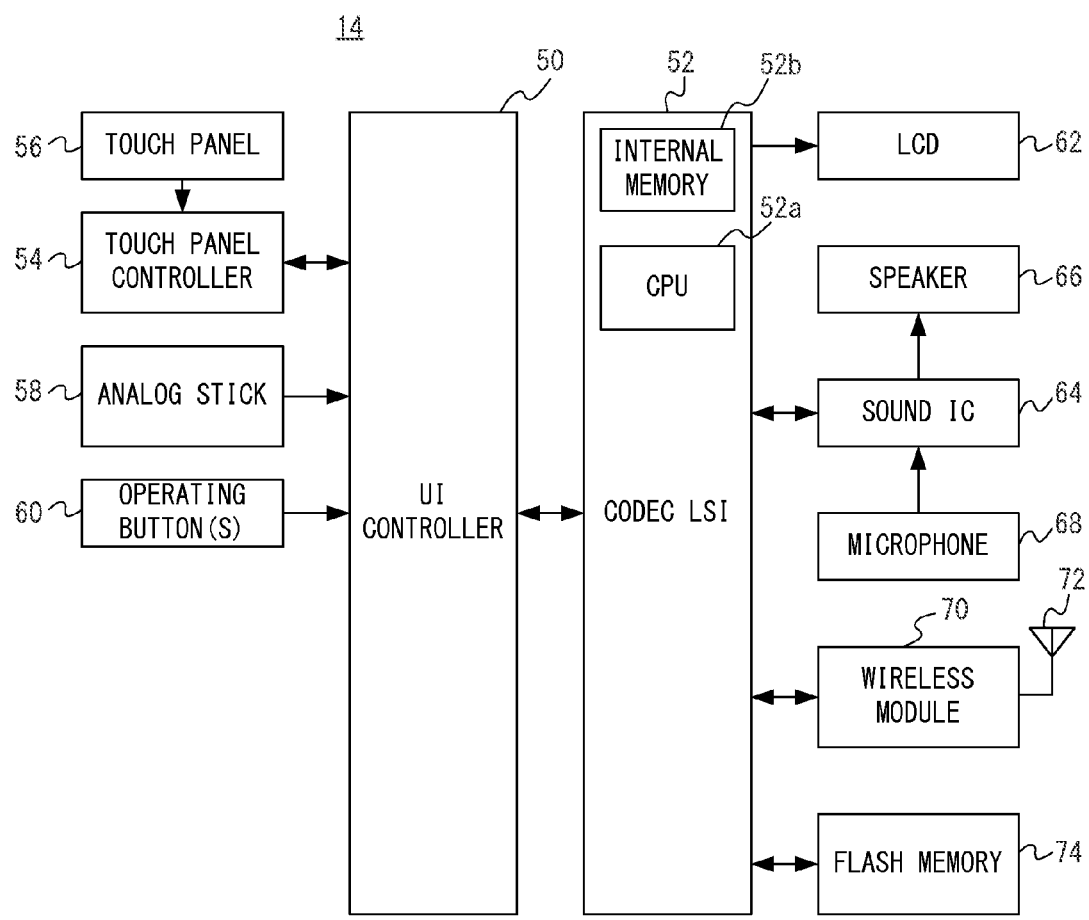
FIG. 3 is a block diagram showing a non-limiting example electric configuration of a terminal device.

In addition, the image data from the terminal device 14 includes image data corresponding to an image that is imaged by a camera not shown and so on, the sound data from the terminal device 14 includes sound data corresponding to a sound (voice, hand clapping, etc.) that is generated by the player and detected by a microphone 68 (see FIG. 3).

On the other hand, the terminal operating data from the terminal device 14, that has less data than images and sounds, may not be performed with the compression processing. Also, it may be encoded as required or may not be encoded. Accordingly, the terminal operating data is received in the terminal communication module 32, and then output to the input-output processor 22a via the codec LSI 30. The input-output processor 22a stores (temporarily stores) the data received from the terminal device 14 in the buffer area of the internal main memory 22e or the external main memory 26.

In addition, it is not necessary to limit the structure of the game apparatus 12 to this embodiment, and the game apparatus 12 may have structure capable of connecting with expansion equipment.

FIG. 3 is a block diagram showing a non-limiting example electric configuration of the terminal device 14. As shown in FIG. 3, the terminal device 14 has a user interface controller (UI controller) 50, a touch panel controller 54, a codec LSI 52, a speaker 66, a sound IC 64, a microphone 68, a wireless module 70, an antenna 72 and a flash memory 74 besides the components shown in FIG. 1. These electronic components are mounted on an electronic circuit board and contained in the housing.

The UI controller 50 is a circuit for controlling an input and an output of data to and from various input-output portions. The UI controller 50 is connected with the touch panel controller 54, the analog stick 58 and the operating button 60. Also, the UI controller 50 is connected to the codec LSI 52.

The touch panel controller 54 is connected to the touch panel 56, and is a circuit for performing control on the touch panel 56. The touch panel controller 54 generates touch position data in a predetermined format on the basis of a signal from the touch panel 56 to output to the UI controller 50. The touch position data represents coordinates of the position (touch position) where a touch input (input operation) is made on an inputting surface of the touch panel 56.

Here, the touch panel controller 54 performs reading of signals from the touch panel 56 and generation of touch position data at a rate of once in a each predetermined time period. Furthermore, from the UI controller 50 to the touch panel controller 54, various control instructions with respect to the touch panel 56 are output.

The analog stick 58 is a direction input portion that a movable member (a stick portion, for example) can be inclined to an arbitrary direction (up and down direction, left and right direction and an oblique direction) with respect to a surface of the housing of the terminal device 14. The analog stick is also a push button that the stick portion can be depressed approximately vertically toward a rear surface side of the terminal device 14. It should be noted that the rear surface is a surface at a back side (opposite) to a side that the analog stick 58, the operating buttons 60 and the LCD 62 are provided on the housing of the terminal device 14. That is, by using the analog stick 58 of this embodiment, it is possible to perform an operation that the stick portion is inclined to an arbitrary direction and an operation that the stick portion is depressed. Accordingly, the analog stick 58 outputs to the UI controller 50 data (hereinafter, called "stick operation data") including data (inclination data) of a direction (inclining direction) and an amount (inclining amount) at a time that the stick portion is inclined and operation button data representing a status (hereinafter, called "button depressing status") whether the stick portion is depressed.

In addition, in this embodiment, the analog stick 58 that the stick portion can be inclined is used, but not limited to this. The analog stick 58 may be a direction input portion that the sick portion is slidable in an arbitrary direction with respect to the surface of the housing of the terminal device 14.

The operating buttons 60 output the operation button data representing a button depressing status (a status whether depressed or not) with respect to the various kinds of push buttons or key switches to the UI controller 50. The operating buttons 60 include push buttons such as a cross button, A button, B button, X button, Y button, etc., for example.

The UI controller 50 outputs terminal operation data including the touch position data, the stick operation data, and the operation button data that are received from the above-described respective structural elements or components to the codec LSI 52.

The codec LSI 52 is a circuit for performing the compression processing on data to be sent to the game apparatus 12 and the expansion processing on the data sent from the game apparatus 12. The codec LSI 52 is connected with the LCD 62, the sound IC 64, the wireless module 70 and the flash memory 74. Also, the codec LSI 52 includes a CPU 52a and an internal memory 52b.

The terminal device 14 is constructed not to perform the game processing itself, but needs to execute a minimum program for management of the terminal device 14 and communication. If the CPU 52a reads the program that is stored in the flash memory 74 into the internal memory 52b to execute the programs when the power is turned on, the terminal device 14 is activated. Here, the terminal device 14 is activated and suspended on the basis of operating data from the game apparatus 12. It should be noted that in this embodiment, the suspension of the terminal device 14 means a sleep state that the power is supplied to a part of the circuit components (UI controller 50, codec LSI 52 and wireless module 70). In addition, a part of the area of the internal memory 52b is used as a VRAM for the LCD 62.

The sound IC 64 is connected to the speaker 66 and the microphone 68, and is a circuit for controlling an input and output of sound data to and from the speaker 66 and the microphone 68. That is, in a case where the sound data is received from the codec LSI 52, the sound IC 64 outputs a sound signal obtained by performing D/A conversion on the sound data to the speaker 66, to thereby make the speaker 66 output a sound. Also, the microphone 68 detects a sound (voices and cracks (hand clapping), etc. of the user (player)) that the terminal device 14 receives, and outputs a sound signal indicating the sound to the sound IC 64. The sound IC 64 performs A/D conversion on the sound signal from the microphone 68, and outputs the sound data in the predetermined format to the codec LSI 52.

The codec LSI 52 sends to the game apparatus 12 the image data from the camera, the sound data from the microphone 68, and the terminal operating data from the UI controller 50 via the wireless module 70. In this embodiment, the codec LSI 52 performs compression processing on the image data and the sound data similar to the codec LSI 30. The terminal operating data and the image data being compressed and the sound data described above are output to the wireless module 70 as sending data.

The wireless module 70 is connected with the antenna 72, and sends the sending data described above to the game apparatus 12 via the antenna 72. The wireless module 70 has a function similar to the terminal communication module 32 of the game apparatus 12. That is, the wireless module 70 has a function of connecting to the wireless LAN following the system based on the IEEE 802.11n standard, for example. The data to be sent may be encoded as required or may not be encoded.

As described above, the sending data to be sent from the terminal device 14 to the game apparatus 12 include the terminal operation data, the image data and the sound data.

In addition, the terminal device 14 of this embodiment comprises an operating means such as the touch panel 56, the analog stick 58 and the operating buttons 60, but the operating means is not limited to this. For example, the touch panel 56 and a part of the operating buttons 60 may not be provided. In another embodiment, the terminal device 14 may be adapted to have other operating means together with these operating means. For example, as sensors for evaluating a motion (including a position and posture, or changes in the position and the posture) of the terminal device 14, at least one of a magnetic field sensor, an acceleration sensor and a gyro sensor may be provided.

In addition, the terminal device 14 is configured to have the camera and the microphone 68, but in another embodiment, it may not have the camera and the microphone 68, or may have either one of them only.

In FIG. 4, specific contents of the terminal operation data (terminal operation signal) to be sent (input) from the terminal device 14 to the game apparatus 12 are shown. As described above, the terminal operation data includes the touch position data of the touch panel 56, the stick operation data of the first analog stick 58A and the second analog stick 58B and the operation button data of the operating buttons 60. The terminal operation data is produced according to the predetermined format. Accordingly, in the game apparatus 12, it is possible to easily know the operating portion that is operated and the contents thereof, and the operating portion that is not operated by referring to the terminal operation data that is received.

The touch coordinate data is coordinate data of the touch position that is detected by the touch panel 56. The stick operation data of the first analog stick 58A is the inclination data of the inclination information (inclining direction and inclining amount) of the stick portion, and the operation button data of the button depressing status of the stick portion. In addition, the inclining direction of the stick portion is an arbitrary direction (up and down and right and left and oblique direction). Furthermore, the button depressing status of the stick portion is on (depressed)/off (non-depressed). This is true for the depressing status of other push buttons. The stick operation data of the second analog stick 58B is the data of the inclination information of the stick portion, and the data of the button depressing status of the stick portion. Because the details are the same as those of the first analog stick 58A, a duplicate description is omitted.

The cross button is constituted by an upward button, a downward button, a leftward button and a rightward button, and operation button data of the cross button is data of the button depressing status (on/off) for each of these push buttons. The operation button data of each of the A button, B button, X button and Y button is data of the button depressing status (on/off) for each of these push buttons. Although not shown, this is true for operation button data of other buttons provided on the terminal device 14.

In such a game system 10, a predetermined application program such as a game program is executed on the game apparatus 12. At this time, there is an occasion that the game apparatus 12 proceeds with processing of the application program (information processing) according to the terminal operation data from the terminal device 14.

As described above, since the stick operation data of the analog stick 58 includes the inclination data and the operation button data, there is a possibility that the direction designation that the stick portion is inclined and the designation that the stick portion is depressed are simultaneously input.

Therefore, even if the player wishes to designate only the direction by inclining the stick portion, the stick portion may be depressed, and thus, the designation due to the depression may be applied. Even if the player wishes to apply only the designation by depressing the stick portion, the stick portion may be inclined, and thus, the designation due to the inclination may be applied.

More specifically, in a technical specification that the virtual camera that is arranged in the three dimensional virtual space is moved by inclining the stick portion of the analog stick 58 and the position of the virtual camera is reset by depressing the stick portion of the analog stick 58, if the stick is depressed in the middle way of moving of the virtual camera by inclining the stick portion, the position of the virtual camera may be reset, and thus, the virtual camera may return to the original position (the position prior to the moving or the default position).

Furthermore, in a technical specification of the shooting game that by inclining the stick portion of the analog stick 58, the enemy character is aimed in the virtual space or pointed by the muzzle, and by depressing the stick portion of the analog stick 58, the bullet is fired, if the stick portion is inclined at a time that the bullet is to be fired by depressing the stick portion, there is an occasion that the aim and the muzzle is moved (deviated) and thus the bullet is fired in a direction different form the direction that the player aimed at.

It is inconvenient that an operation (information processing) that the player does not intend to is performed, and accordingly, this embodiment is aimed to avoid such inconvenience.

Specifically, in the game apparatus 12, in a case where the inclining amount of the stick portion of the analog stick 58 is equal to or more than a predetermined amount, even if the stick portion is depressed, the processing of the application is performed with regarding as the stick portion is not depressed. That is, by correcting a state that the stick portion is depressed to a state that the stick portion is not depressed, the depression of the stick portion is invalidated.

A reason why a condition that the inclining amount of the stick portion of the analog stick 58 is equal to or more than the predetermined amount is provided is that the stick portion may be slightly inclined when the stick portion is depressed. Furthermore, there is a tendency that the stick portion may be depressed as the inclining amount of the stick increases. For example, it is assumed that the inclining amount in a case of the home position that the stick portion of the analog stick 58 is not inclined is zero (0) and the inclining amount in a case where the stick portion is inclined at maximum in an arbitrary direction is ten (10), the term "state that the stick portion is inclined more than a predetermined amount" means a state that the inclining amount is equal to or more than five (5) (5-10); however, the inclining amount may be more than the predetermined amount only while not including equal to the predetermined amount.

Furthermore, in a case where the stick portion of the analog stick 58 is depressed or in a case where a predetermined time period (ten (10) frames, for example) does not elapse after a state that the stick portion is depressed is changed to a state that the stick portion is not depressed, even if the stick portion is inclined, the processing of the application is performed with regarding as the stick portion is not inclined. That is, by correcting a state that the stick portion is inclined to a state that the stick portion is not inclined, it is invalidated that the stick portion is inclined. It should be noted that "frame" is a unit time for renewing the screen, 1/60 seconds, for example.

As described above, in a case where the stick portion of the analog stick 58 is depressed, the stick portion may be inclined at not only a time that the stick portion is depressed but also a time that the depression of the stick portion is released (freed), and therefore it is intended that the designation due to the inclination of the stick portion at a time of releasing is not applied.

Furthermore, in this embodiment, the processing of the application is performed with regarding as the stick portion is depressed only when the inclining amount of the analog stick 58 is less than five (5) in a case where a state that the stick portion of the analog stick 58 is not depressed (off) is changed to a state that the stick portion is depressed (on). A reason of this is that in this embodiment, the processing of the application is performed with regarding as the stick portion is not depressed in a case where the inclining amount of the stick portion is equal to or more than the predetermined amount. A reason why a condition that a state that the stick portion is not depressed is changed to a state that the stick portion is depressed is adopted is for preventing the designation due to the depression from being received when the inclining amount becomes less than the predetermined amount if the stick portion of the analog stick 58 is operated to get rid of the inclining amount while the stick portion is being depressed, that is, to return the stick portion to the home position.

Figure 5:
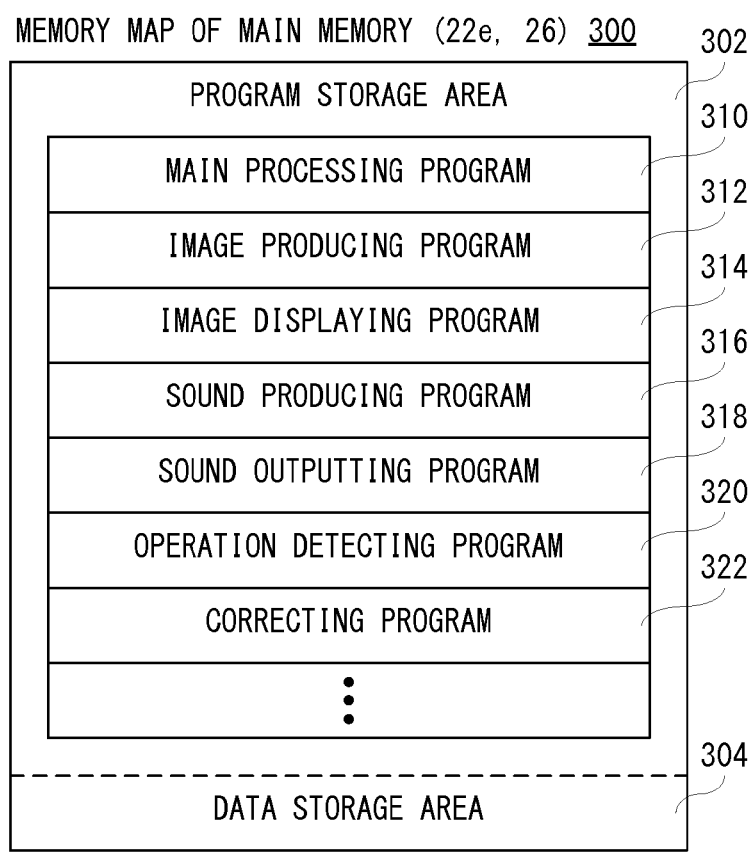
FIG. 5 is a view showing a non-limiting example memory map of a main memory shown in FIG. 2.

FIG. 5 shows an example of a memory map 300 of the main memory (22e, 26) of the game apparatus 12 shown in FIG. 2. As shown in FIG. 5, the main memory (22e, 26) includes a program storage area 302 and a data storage area 304. The program storage area 302 is stored with an information processing program such as a game program. The game program, for example, is partly or wholly read from the optical disk at a suitable timing after the power of the game apparatus 12 is turned on, to be stored in the main memory (22e, 26).

In addition, the game program may be acquired from the flash memory 24 or an external information processing device of the game apparatus 12 (via the Internet, for example) instead of the optical disk. Furthermore, some programs included in the game program may be stored in advance within the game apparatus 12.

In this embodiment, the game program is constituted by a main processing program 310, an image producing program 312, an image displaying program 314, a sound producing program 316, a sound outputting program 318, an operation detecting program 320, a correcting program 322, etc.

The main processing program 310 is a program for performing processing of a main routine (entire processing in FIG. 8) of the virtual game. The image producing program 312 is a program for producing the television game image and for producing the terminal game image by using data such as polygon data, texture data, etc.

The image displaying program 314 is a program for outputting image data of the television game image that is produced in accordance with the image producing program 312 to AV-IC 36 thereby displaying the television game image on the television 16. Furthermore, the image displaying program 314 is also a program for sending the image data of the terminal game image that is produced according to the image producing program 312 to the terminal device 14.

The sound producing program 316 is a program for producing, under the control by the CPU 20, producing a television game sound and a terminal game sound by means of the DSP 22c. The sound outputting program 318 is a program for outputting sound data of the television game sound that is produced according to the sound producing program 316 to the AV-IC 36 thereby outputting the television game sound from the speaker 16a. The sound outputting program 318 is also a program for sending sound data of the terminal game sound that is produced according to the sound producing program 316 to the terminal device 14.

The operation detecting program 320 is a program for detecting (receiving) the terminal operating data included in the sending data that is input (sent) from the terminal device 14. The correcting program 322 is a program for correcting the stick operation data of the analog stick 58 out of the terminal operation data that is detected according to the operation detecting program 320.

In addition, the program storage area 302 is further stored with a communication program, a backup program, etc.

Figure 6:
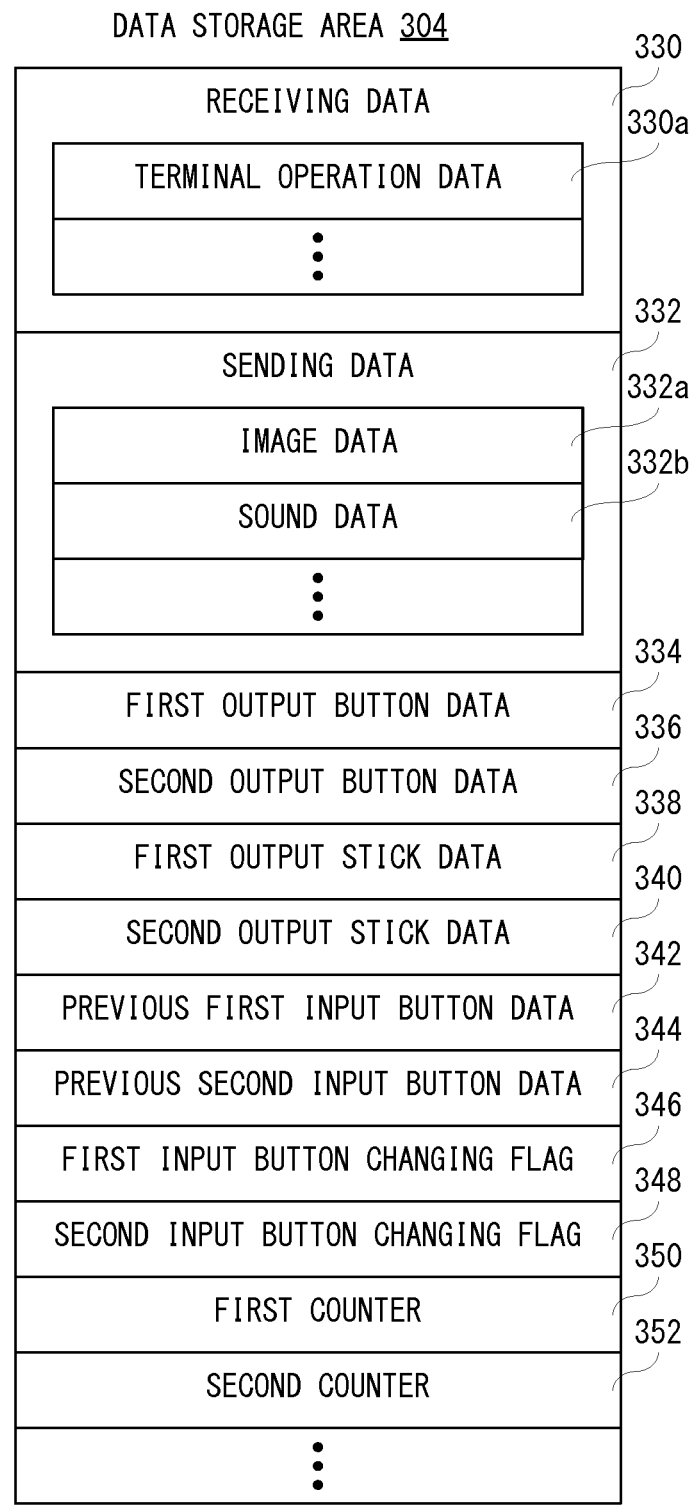
FIG. 6 is a view showing non-limiting specific contents of a data storage area shown in FIG. 5.

FIG. 6 shows an example of specific contents of the data storage area 304 shown in FIG. 5. As shown in FIG. 6, the data storage area 304 is stored with receiving data 330, sending data 332, first output button data 334, second output button data 336, first output stick data 338, second output stick data 340, previous first output button data 342, previous second output button data 344, etc.

The receiving data 330 is various kinds of data received from the terminal device 14. The receiving data 330 includes terminal operating data 330a. In a case where the terminal device 14 is connected to the game apparatus 12 in a plural number corresponding to each of the respective terminal devices 14, the terminal operating data 330a is also stored in a plural number.

The terminal operation data 330a is data representing an operation by the player to the terminal device 14, and as described above, includes touch position data, stick operation data and operation button data. However, the terminal operation data 330a has only to be data representing an operation by the player who operates the terminal device 14, and may include any one of the above-described data only. The terminal operation data 330a is sent from the terminal device 14 and acquired in the game apparatus 12 to be stored in the main memory (22e, 26).

In addition, in the main memory (22e, 26), a predetermined number of terminal operating data may be stored in an order of the newest data (data acquired at the last) sequentially.

The sending data 332 includes image data 332a, sound data 332b, etc. The image data 332a is produced through the game processing (entire processing, described later), and includes image data of the terminal game image that is output by the terminal device 14 and so on. The sound data 332b is produced through the game processing, and includes sound data of the terminal game sound that is output by the terminal device 14.

The first output button data 334 is data about the button depressing status of the stick portion of the analog stick 58A to be used in the processing of the application (in this embodiment, "game", and so forth). The second output button data 336 is data about the button depressing status of the stick portion of the analog stick 58B to be used in the processing of the application.

The first output stick data 338 is data about the inclining direction and the inclining amount of the stick portion of the analog stick 58A for using in the processing of the application. The second output stick data 340 is data about the inclining direction and the inclining amount of the stick portion of the analog stick 58B for using in the processing of the application.

In addition, the first output button data 334, the second output button data 336, the first output stick data 338 and the second output stick data 340 are data that the stick operation data of the analog stick 58A and the analog stick 58B are subjected to the correcting processing according to the correcting program 322 out of the terminal operation data that is input to the game apparatus from the terminal device 14.

The previous first output button data 342 is data about the button depressing status of the stick portion of the analog stick 58A out of the terminal operation data that is input from the terminal device 14 in the previous frame. The previous second output button data 344 is data about the button depressing status of the stick portion of the analog stick 58B out of the terminal operation data that is input from the terminal device 14 in the previous frame.

Furthermore, the data storage area 304 is provided with a first input button change flag 346, a second input button change flag 348, a first counter 350 and a second counter 352.

The first input button change flag 346 is a flag for determining whether the button depressing status of the stick portion of the analog stick 58A in the terminal device 14 is changed from off to on, and being constructed by a 1-bit register. If the button depressing status of the stick portion of the analog stick 58A in the terminal device 14 is changed from off to on, the first input button change flag 346 is turned on and thus a data value "1" is set in the register. If the button depressing status of the stick portion of the analog stick 58A in the terminal device 14 is not changed from off to on, or changed from on to off, the first input button change flag 346 is turned off and thus a data value "0" is set in the register.

The second input button change flag 348 is a flag for determining whether the button depressing status of the stick portion of the analog stick 58B in the terminal device 14 is changed from off to on, and being constructed by a 1-bit register. If the button depressing status of the stick portion of the analog stick 58B in the terminal device 14 is changed from off to on, the second input button change flag 348 is turned on and thus a data value "1" is set in the register. If the button depressing status of the stick portion of the analog stick 58B in the terminal device 14 is not changed from off to on, or changed from on to off, the second input button change flag 348 is turned off and thus a data value "0" is set in the register.

The first counter 350 is a counter for counting a time period that the stick portion of the analog stick 58A is not depressed (turned off), and counts the predetermined time period (in this embodiment, ten (10) frames).

The second counter 352 is a counter for counting a time period that the stick portion of the analog stick 58B is not depressed (turned off), and counts the predetermined time period (in this embodiment, ten (10) frames).

Although not shown, the data storage area 304 is stored with other data such as sound data and sound wave-form data, and provided with other flags and counters (timers).

Figure 7:
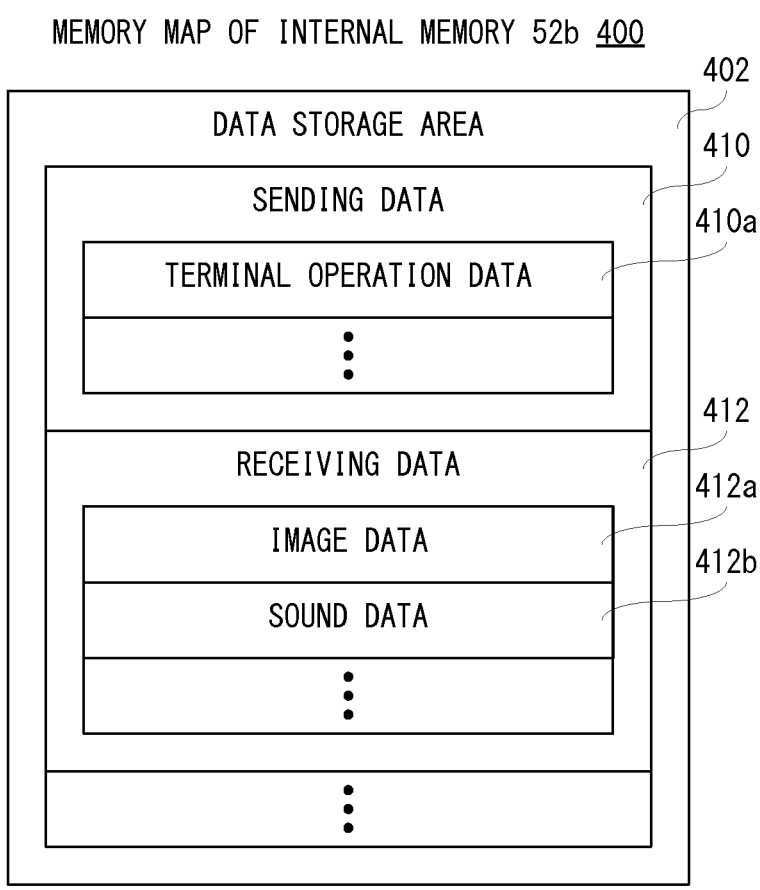
FIG. 7 is a view showing a non-limiting example memory map of an internal memory shown in FIG. 3.

FIG. 7 shows an example of a memory map 400 of the internal memory 52*b* of the terminal device 14 shown in FIG. 3. As shown in FIG. 7, the internal memory 52*b* includes a data storage area 402.

The data storage area 402 is stored with the sending data 410 and the receiving data 412.

The sending data 410 includes the terminal operation data 410*a*. Since the terminal operation data 410*a* has the same contents as those of the terminal operation data 330*a* included in the above-described receiving data 330, a duplicate description is omitted here.

The receiving data 412 includes image data 412*a*, sound data 412*b*, etc. Since these have the same contents as the image data 332*a* and the sound data 332*b* included in the above-described sending data 332, a duplicate description is omitted here.

Although not shown, the data storage area 402 may be stored with other data necessary for operation of the terminal device 14, and is provided with flags and counters (timers).

Figure 8:
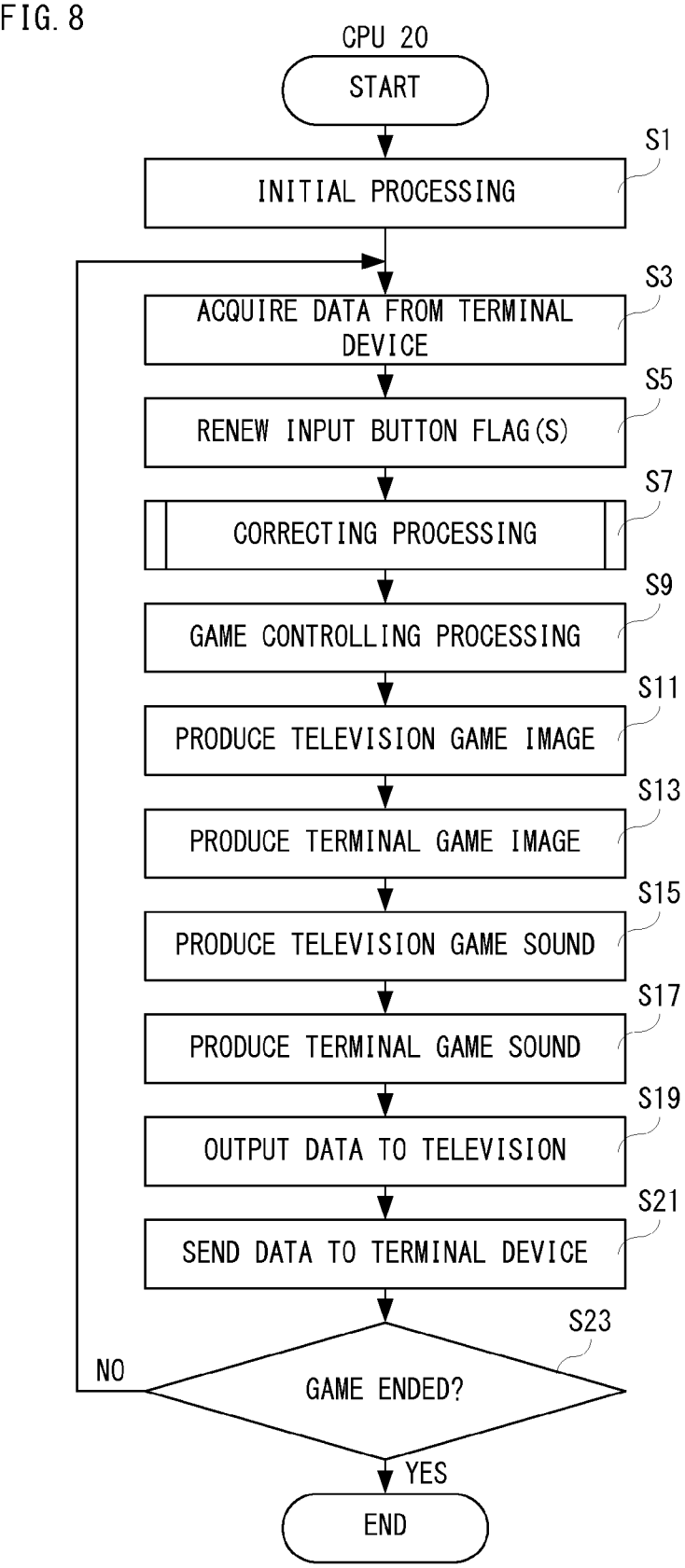
FIG. 8 is a flowchart showing non-limiting example entire processing by a CPU of the game apparatus shown in FIG. 2.
Figure 9:
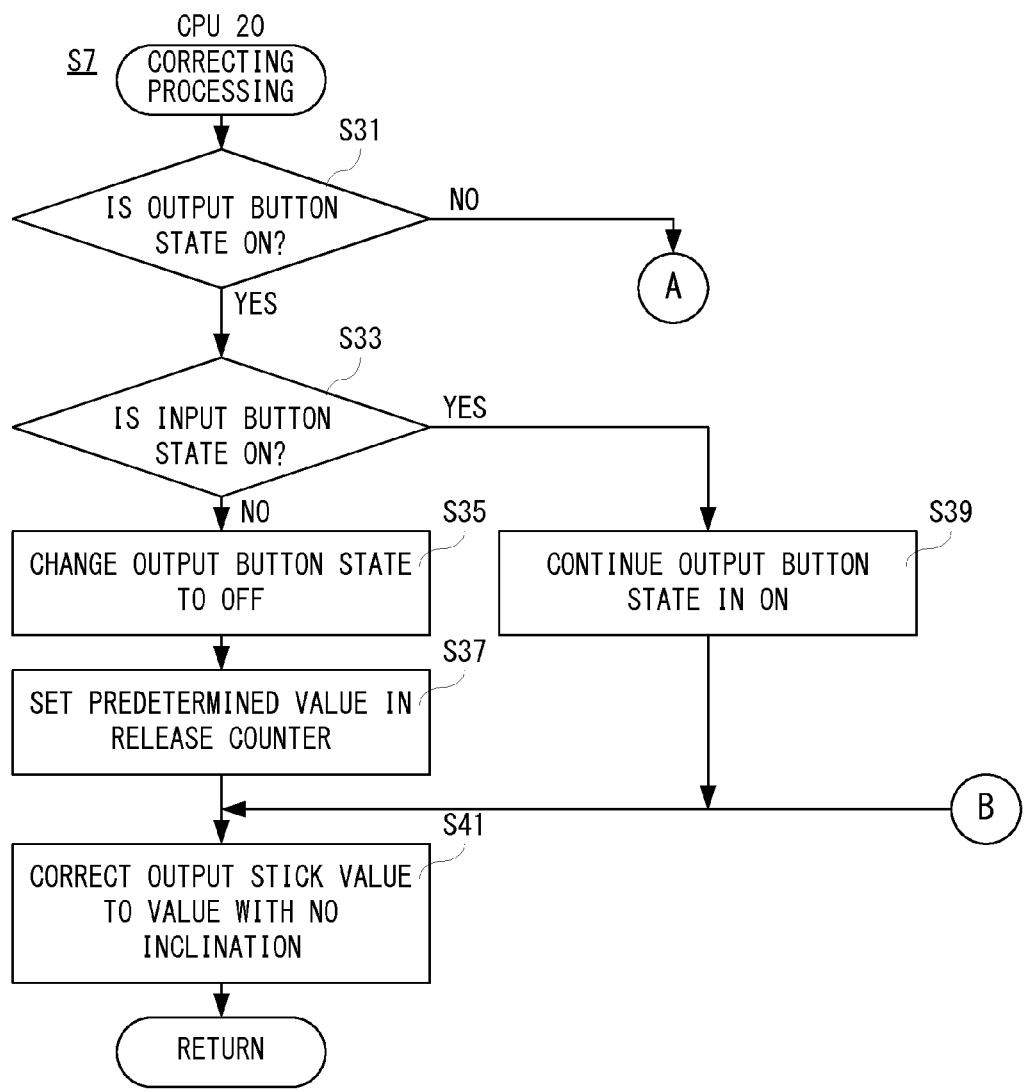
FIG. 9 is a flowchart showing a part of non-limiting example correcting processing by the CPU of the game apparatus shown in FIG. 2.
Figure 10:
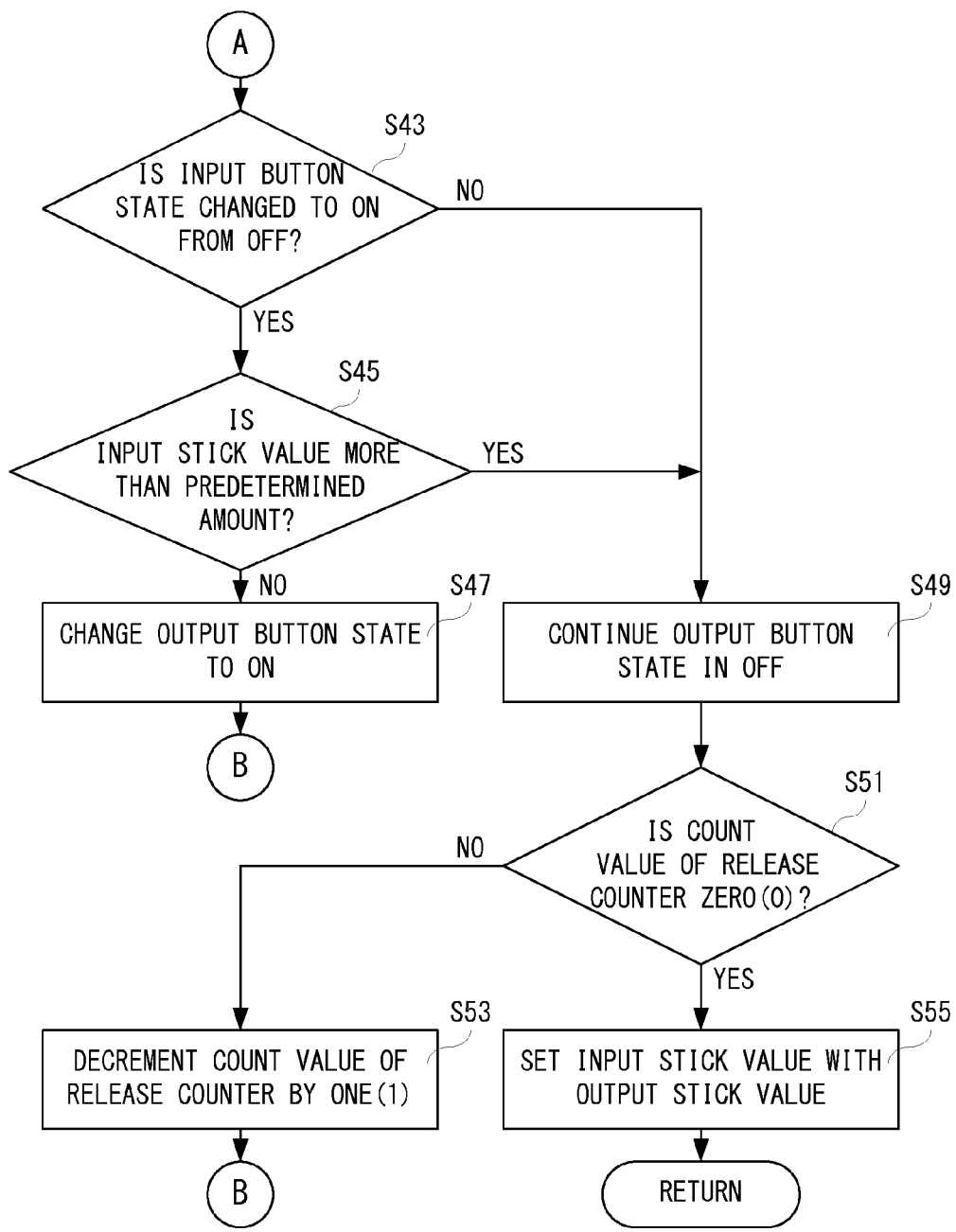
FIG. 10 is a flowchart showing another part of the non-limiting example correcting processing by the CPU of the game apparatus shown in FIG. 2.

FIG. 8 is a flowchart for non-limiting example entire game processing by the CPU 20 provided in the game apparatus 12 shown in FIG. 2. In addition, the processing in respective steps of the flowchart shown in FIG. 8 (similar to FIG. 9 and FIG. 10, described later) are only examples, and therefore, as far as the same or similar results can be obtained, a processing order of the respective steps may be exchanged. Furthermore, this embodiment is described on an assumption that the processing of the respective steps in flowcharts shown in FIG. 8 to FIG. 10 are performed by the CPU 20 basically; however, a part of the steps may be performed by a processor(s) and a dedicated circuit(s) other than the CPU 20.

If the power of the game apparatus 12 is turned on, prior to performing the entire processing, the CPU 20 executes an activating program stored in a boot ROM not shown, whereby respective modules such as the main memory (22*e*, 26), etc. can be initialized. Then, the game program stored in the optical disk is read in the main memory (22*e*, 26), thereby to start an execution of the game program by the CPU 20.

When the entire processing is started, the CPU 20 performs initial processing in a step S1. In the initial processing, a virtual game space for producing and displaying the game screen 100 is constituted to arrange respective characters or objects such as the player character 102, etc. that appear in the game space at their initial positions. Furthermore, in the initial processing, the CPU 10 sets initial values of various kinds of parameters used in the game processing.

Subsequently, in a step S3, the CPU 20 acquires various kinds of data sent from the terminal device 14, and in a step S5, the CPU 20 renews input button flags. In this step, the CPU 20 acquires the depressing status of the stick portion of the analog stick 58A with referring to the terminal operation data that is received from the terminal device 14, and compares the depressing status of the stick portion of the analog stick 58A with the depressing status indicated by the previous first input button data 342. Then, the CPU 20 turns-on the first input button change flag 346 if the button depressing status of the stick portion of the analog stick 58A is changed from off to on, and otherwise, turns-off the first input button change flag 346. Similarly, the CPU 20 turns-on or turns-off the second input button change flag 348 based on the depressing status of the stick portion of the analog stick 58B and the depressing status indicated by the previous second input button data 344. Furthermore, the CPU 20 stores, after renewing the first input button change flag 346 and the second input button change flag 348, the data of the button depressing status of the stick portion of the analog stick 58A included in the terminal operation data that is received this time as the previous first input button data 342, and stores the data of the button depressing status of the stick portion of the analog stick 58B included in the terminal operation data that is received this time as the previous second input button data 344.

Subsequently, in a step S7, the CPU 20 performs correcting processing that will be described later (see FIG. 9 and FIG. 10), and performs game controlling processing in a step S9. In the step S9, according to the operation by the player or regardless of the player's operation, the CPU 20 performs various kinds of processing for the game, for example, operating the characters such as a player character, determining the game clear or the game over, etc. In such the game controlling processing, the terminal operation data that is corrected in the step S7 is used; however, data that the correcting processing is applied is the stick operation data (including the inclination data and the operation button data) for the analog sticks 58A and 58B.

In a next step S11, the CPU 20 and the GPU 22*b* perform producing processing of the television game image for displaying the game image on the television 16. Briefly describing, the CPU 20 and the GPU 22*b* read the data indicating the result of the game controlling processing in the step S9 from the main memory (22*e*, 26) and read the data necessary for producing the game image from the VRAM 22*d* so as to produce the television game image.

In a step S13, the CPU 20 and the GPU 22*b* performs producing processing of the terminal game image for displaying the game image on the terminal device 14. Briefly describing, as similar to the above-described television game image, the terminal game image is also produced by reading the data indicating the result of the game controlling processing in the step S9 from the main memory (22*e*, 26) and read the data necessary for producing the game image from the VRAM 22*d*.

Subsequently, in a step S15, the CPU 20 produces the television game sound to output to the speaker 16a of the television 16. That is, the CPU 20 causes the DSP 22c to produce the game sound according to the result of the game controlling process in the step S9.

Next, in a step S17, the CPU 20 produces the terminal game sound for outputting the same to the speaker 66 of the terminal device 14. That is, the CPU 20 causes the DSP 22c to produce the game sound according to the result of the game controlling process in the step S9.

In addition, in a case where the television game sound and the terminal game sound are the same, the processing in the step S15 or the step S17 may not be performed.

Subsequently, in a step S19, the CPU 20 outputs data to the television 16. Specifically, the CPU 20 sends to the AV-IC 36 the image data for the television game image that is stored in the VRAM 22d and the sound data for the television game sound that is produced by the DSP 22c in the step S15.

Next, in a step S21, the CPU 20 sends data to the terminal device 14. Specifically, the image data for the terminal game image that is stored in the VRAM 22d and the sound data for the terminal game sound that is produced by the DSP 22c in the step S17 are sent to the codec LSI 52 by the CPU 20 to be subjected to the predetermined compression processing by the codec LSI 52. Then, data of the image and the sound subjected to the compression processing are sent to the terminal device 14 by the terminal communication module 32 via the antenna 34. The terminal device 14 receives the data of the image and the sound sent from the game apparatus 12 by the wireless module 70 to be conducted to the predetermined expansion processing by the codec LSI 52. The image data being performed with the expansion processing is output to the LCD 62 and the sound data being performed with the expansion processing is output to the sound IC 64.

Then, in a step S23, the CPU 20 determines whether the game is to be ended. Determination in the step S23 is performed by determining whether the game is made over or whether the player inputs an instruction to stop the game, for example.

If "NO" is determined in the step S23, that is, if the game is not to be ended, the process returns to the step S3. On the other hand, if "YES" is determined in the step S23, that is, if the game is to be ended, the entire processing is terminated.

FIG. 9 and FIG. 10 are flowcharts showing non-limiting example correcting processing in the step S7 in FIG. 8. The correcting processing is performed for each of the analog sticks 58A and 58B; however, only the correcting processing for the analog stick 58A is described, and the correcting processing for the analog stick 58B will be omitted here because the correcting processing for the analog stick 58B is similar to the correcting processing for the analog stick 58A.

As shown in FIG. 9, the CPU 20 determines whether the output button state is on in a step S31 upon starting of the correcting processing. Here, the CPU 20 determines whether the button depressing status of the first output button data 334 is on. That is, the CPU 20 determines whether the button depressing status of the stick portion of the analog stick 58A after the correcting processing is applied in the previous frame is on.

If "NO" is determined in the step S31, that is, if an output button state is off, the process proceeds to a step S43 shown in FIG. 10. On the other hand, if "YES" is determined in the step S31, that is, if the output button state is on, in a step S33, it is determined whether an input button state is on. Here, it is determined whether the button depressing status of the stick portion of the analog stick 58A at the current frame is on with referring to the terminal operation data that is acquired in the step S3.

If "NO" is determined in the step S33, that is, if the input button state is off, the output button state is changed to off in a step S35. That is, the CPU 20 stores the first output button data 334 that the button depressing status is off in the data storage area 304. In a next step S37, the predetermined value is set in a release counter. Here, the CPU 20 sets the predetermined value (in this embodiment, ten (10)) in the first counter 350, and then, the process proceeds to a step S41.

If "YES" is determined in the step S33, that is, if the input button state is on, in a step S39, the output button state is continued in on. That is, the first output button data 334 is not renewed, and the process proceeds to the step S41.

In the step S41, the output stick value is corrected to a value that the stick portion is not inclined, and the process returns to the entire processing shown in FIG. 8. In the step S41, the CPU stores the first output stick data 338 indicating that the inclining direction is nothing, i.e., null of inclination and the inclining amount is zero (0) in the data storage area 304.

As described above, in a case where the output button state is off, "NO" is determined in the step S31, and then, in the step S43 shown in FIG. 10, it is determined whether the input button state is changed from off to on. Here, the CPU 20 determines whether the first input button change flag 346 is on.

If "NO" is determined in the step S43, that is, if the input button state is not changed from off to on, the process proceeds to a step S49. If "YES" is determined in the step S43, that is, if the input button state is changed from off to on, in a step S45, it is determined whether an input stick value is equal to or more than the predetermined amount. In addition, in this embodiment, the predetermined amount is "five (5)" in a case where the inclining amount is "zero (0)" at a time that the stick portion of the analog stick 58A exists at the home position (not inclined) and the inclining amount is "ten (10)" at a time that the stick portion is inclined in an arbitrary direction at maximum.

If "NO" is determined in the step S45, that is, if the input stick value is less than the predetermined amount, the output button state is changed to on in a step S47, and then, the process proceeds to the step S41 shown in FIG. 9. In addition, the CPU 20 stores in the data storage area 304 the first output button data 334 that state information is on in the step S47.

If "YES" is determined in the step S45, that is, if the input stick value is equal to or more than the predetermined amount, the output button state is continued in off in a step S49, and then, the process proceeds to a step S51. That is, in the step S49, the CPU 20 does not renew the first output button data 334. Thus, even if the input button state is changed from off to on by depressing the stick portion ("YES" in the step S43), the output button state is continued in off, and therefore, it is invalidated that the stick portion is depressed.

In the step S51, it is determined whether the count value of the release counter is zero (0). That is, the CPU 20 determines whether the count value of the first counter becomes zero (0). If "NO" is determined in the step S51, that is, if the count value of the release counter is not zero (0), the count value of the release counter (here, the first counter 350) is decremented by one (1) in a step S53, and then, the process proceeds to the step S41 in FIG. 9. If "YES" is determined in the step S51, that is, if the count value of the release counter is zero (0), an output stick value is set as the input stick value in a step S55, and then, the process returns to the entire processing. That is, the CPU 20 stores in the step S55 the stick operation data of the analog stick 58A at the current frame as the first output stick data 338 in the data storage area 304. Thus, even if the stick is inclined, in a case where the stick portion is depressed or in a case where the predetermined time period does not elapse after the stick portion is changed from a state that the stick portion is depressed to a state that the stick portion is not depressed, the inclining amount is corrected to "zero (0), and it is invalidated that the stick portion is inclined.

According to this embodiment, in a case where the analog stick that also functions as a push button by depressing the stick portion is operated, when the stick portion is inclined at an amount equal to or more than the predetermined amount, the input by depressing the stick portion is invalidated, and when the stick portion is depressed or when the predetermined time period does not elapse after the stick portion is changed from a state that the stick portion is depressed to a state that the stick portion is not depressed, the input by inclining the stick portion is invalidated. Therefore, it is possible to prevent the processing according to the designation that the operator does not intend to from being performed.

In addition, although the two analog sticks are provided on the terminal device in this embodiment, at least one analog stick may be provided, and three or more analog sticks may be provided.

Furthermore, in this embodiment, the game system that the game apparatus and the input device such as the terminal device perform wireless communication with each other is described, but not limited to this. The input device may be connected to the game apparatus by a wire or cable, and the game apparatus such as an arcade game machine or a portable game machine that the input device and the game apparatus are integrally formed.

Furthermore, in this embodiment, because the input device such as the terminal device is provided with a LCD and a speaker, in FIG. 8, the terminal game image is produce (S13) and the terminal game sound is also produced (S17) to be sent to the terminal device (S22), but these processing may not be performed. The terminal game image is produced (S13) or the terminal game sound is produced (S17), and the terminal game image thus produced or the terminal game sound thus produced may be sent to the terminal device (S21). In a case where the terminal device is not provided with the LCD and the speaker, these processing (S13, S17 and S21) are, off course, not performed.

Furthermore, in this embodiment, the game apparatus is mentioned as one example of the information processing apparatus; however, the present invention can be applied to a computer such as a general-purpose personal computer or a workstation. In such a case, an input device of the computer may be provided with an analog stick that also functions as a push button.

In this embodiment, an analog stick that also functions as a push button is described, but not limited to this. For example, similar correcting processing can be applied to an operation of a mouse wheel that also functions as a push button. In a case where an operation of the push button is received, for example, a rotating operation of the mouse wheel may be invalidated. On the other hand, if the rotating operation is received, for example, an operation of the push button may be invalidated.

In addition, specific numeral values indicated in the above-described embodiments are mere examples, and should be suitably set according to the technical specification of the actual products.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood which the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus configured to perform information processing according to operation of an operating device comprising an analog input device that also functions as a depressible push button, the information processing apparatus comprising:
processing circuitry configured to control the information processing apparatus to perform operations comprising:
detecting first operation information indicative of an amount corresponding to an input to the analog input device;
using the first operation information as input for a first information processing operation;
detecting second operation information indicative of a depressing of the analog input device;

using the second operation information as input for a second information processing operation different from the first information processing operation;

invalidating detected second operation information based on determining that an amount corresponding to the input to the analog input device is greater than a predetermined non-zero amount; and invalidating detected first operation information, when first operation information is detected while second operation information is detected or when a predetermined time period does not elapse after a state in which second operation information is detected is changed to a state in which no second operation information is detected.

2. An information processing system configured to perform information processing according to operation of an operating device comprises an analog input device that also functions as a depressible push button, the information processing apparatus comprising:

processing circuitry configured to control the information processing apparatus to perform operations comprising:

detecting first operation information indicative of an amount corresponding to an input to the analog input device;

using the first operation information as input for a first information processing operation;

detecting second operation information indicative of a depressing of the analog input device;

using the second operation information as input for a second information processing operation different from the first information processing operation;

invalidating detected second operation information based on determining that an amount of input to the analog input device is greater than a predetermined non-zero amount; and invalidating detected first operation information, when first operation information is detected while second operation information is detected or when a predetermined time period does not elapse after a state in which second operation information is detected is changed to a state in which no second operation information is detected.

3. A non-transitory storage medium storing an information processing program which, when executed, causes a computer to perform information processing according to an operation of an operating device comprising an analog input device that also functions as a depressible push button, the information processing program causing the computer to perform operations comprising:

detecting first operation information indicative of an amount corresponding to an input to the analog input device;

using the first operation information as input for a first information processing operation;

detecting second operation information indicative of a depressing of the analog input device;

using the second operation information as input for a second information processing operation different from the first information processing operation;

invalidating detected second operation information based on determining that an amount corresponding to an input to the analog input device is greater than a predetermined non-zero amount; and invalidating detected first operation information, when first operation information is detected while second operation information is detected or when a predetermined time period does not elapse after a state in which second operation information is detected is changed to a state in which no second operation information is detected.

4. An information processing method of a computer that performs information processing according to an operation of an operating device comprising an analog input device that also functions as a depressible push button, the method comprising:

(a) detecting first operation information indicative of an amount corresponding to an input to the analog input device;

(b) using the first operation information as input for a first information processing operation;

(c) detecting second operation information indicative of a depressing of the analog input device;

(d) using the second operation information as input for a second information processing operation different from the first information processing operation;

(e) invalidating detected second operation information based on determining that an amount corresponding to an input to the analog input device is greater than a predetermined non-zero amount; and (f) invalidating detected first operation information, when first operation information is detected while second operation information is detected or when a predetermined time period does not elapse after a state in which second operation information is detected is changed to a state in which no second operation information is detected.

* * * * *